(12) United States Patent
Gonska et al.

(10) Patent No.: US 7,975,812 B2
(45) Date of Patent: Jul. 12, 2011

(54) WHEEL HUB FOR CAMSHAFT SERVICEABILITY

(75) Inventors: David G. Gonska, Beverly Hills, MI (US); Scott A. Jenkinson, Davisburg, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 817 days.

(21) Appl. No.: 11/873,708

(22) Filed: Oct. 17, 2007

(65) Prior Publication Data
US 2009/0101457 A1    Apr. 23, 2009

(51) Int. Cl.
*F16D 65/14* (2006.01)
(52) U.S. Cl. ............ 188/205 R; 188/206 A; 188/206 R; 188/341; 301/84; 301/105.1
(58) Field of Classification Search ................ 188/18 R, 188/205 R, 206 R, 324, 329, 330, 332, 338, 188/339; 301/84, 105.1, 107, 64.307, 78, 301/6.6, 111.03
See application file for complete search history.

(56) References Cited

U.S. PATENT DOCUMENTS

| | | | | |
|---|---|---|---|---|
| 1,368,654 | A | * | 2/1921 | Nicholas ........................ 301/84 |
| 1,381,635 | A | * | 6/1921 | Hannegan ...................... 301/84 |
| 1,387,444 | A | * | 8/1921 | White ............................ 301/6.1 |
| 1,488,758 | A | * | 4/1924 | Edward ......................... 301/84 |
| 1,521,934 | A | * | 1/1925 | Eicher ........................... 301/130 |
| 3,339,677 | A | * | 9/1967 | Behnke ......................... 188/341 |
| 4,206,834 | A | * | 6/1980 | Williams ...................... 188/341 |
| 5,316,111 | A | | 5/1994 | Layfield |
| 6,089,361 | A | | 7/2000 | Davison et al. |
| 6,409,280 | B1 | | 6/2002 | Mair |
| 6,622,828 | B1 | | 9/2003 | DeLeeuw et al. |
| 7,055,662 | B1 | * | 6/2006 | Jones et al. ................... 188/341 |
| 2002/0041122 | A1 | | 4/2002 | Mair |
| 2006/0225974 | A1 | * | 10/2006 | Inada et al. ............... 188/206 A |

* cited by examiner

*Primary Examiner* — Robert Siconolfi
*Assistant Examiner* — Mariano Sy
(74) *Attorney, Agent, or Firm* — Carlson, Gaskey & Olds, PC

(57) ABSTRACT

A wheel hub includes a hub flange that extends about the wheel hub. The hub flange includes a removed section that is aligned with a camshaft assembly. An insert is used to fill the removed section. The insert is selectively removable from the hub flange to provide access to the removed section such that the camshaft assembly can be removed from a brake assembly via the removed section without having to remove the wheel hub from an axle assembly.

19 Claims, 4 Drawing Sheets

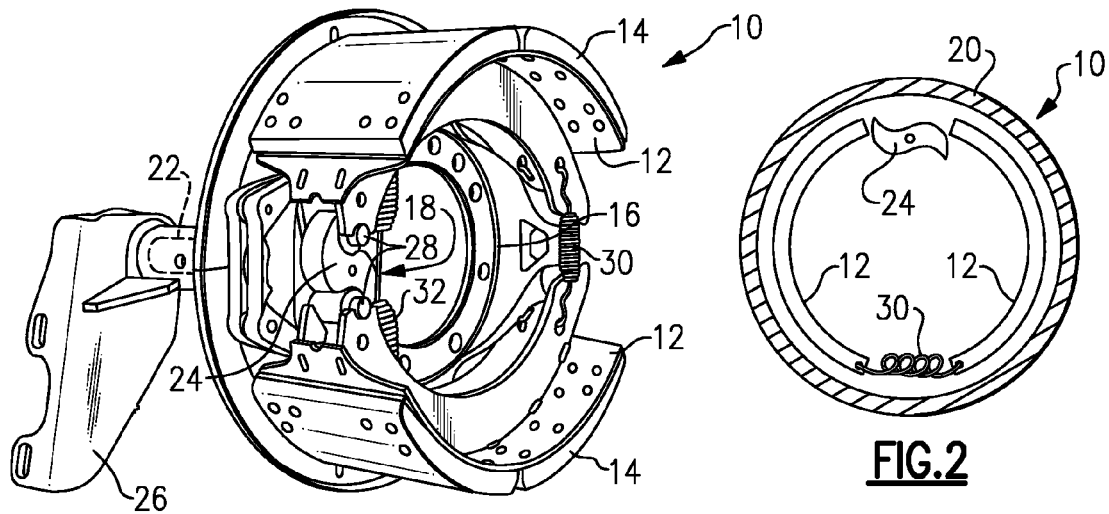
FIG. 1
FIG. 2
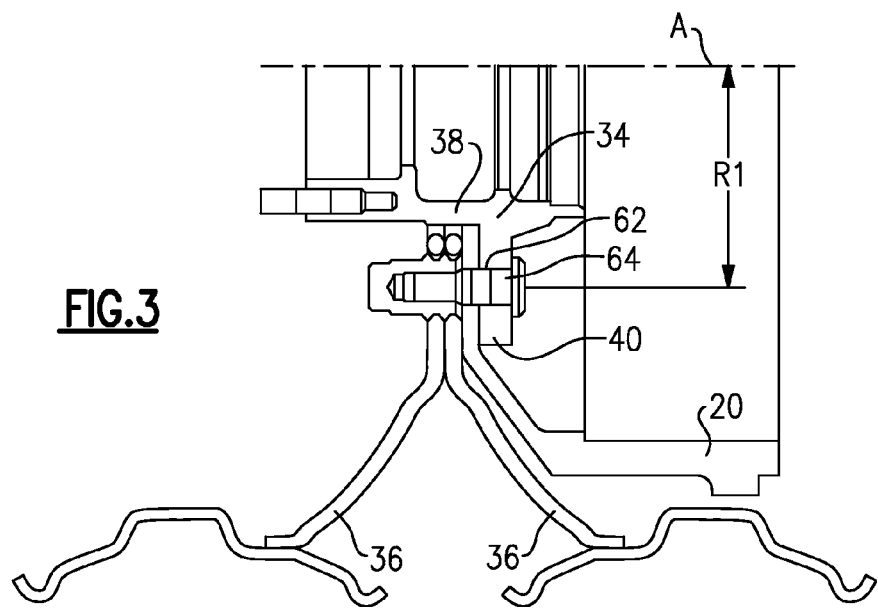
FIG. 3
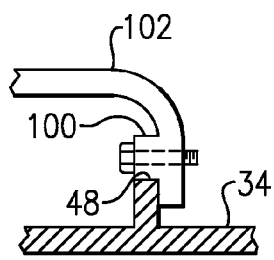
FIG. 7
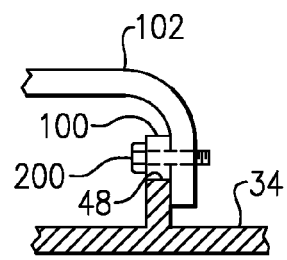
FIG. 8

WHEEL HUB FOR CAMSHAFT SERVICEABILITY

TECHNICAL FIELD

The subject invention is directed to a wheel hub for a drum brake that allows a camshaft assembly to be removed from a vehicle brake without having to remove the wheel hub from an axle assembly.

BACKGROUND OF THE INVENTION

To service a camshaft assembly for a drum brake, a wheel hub typically must be removed before the camshaft assembly can be removed. This is labor intensive and time consuming. Further, removal of the wheel hub results in the need to re-lubricate wheel bearings, as well as requiring replacement of an inboard lubricant seal and an outboard lubricant gasket, which is expensive.

In some wheel assemblies, the wheel hub has been modified to facilitate removal of the camshaft but these modifications have not been effective and/or have weakened the wheel hub in an unsatisfactory manner.

SUMMARY OF THE INVENTION

A wheel hub is rotatable about an axis and includes a hub flange that extends about the wheel hub. The hub flange includes a removed section that is to be aligned with a camshaft assembly. An insert is used to fill the removed section. The insert is selectively removable from the hub flange to provide access to the removed section such that the camshaft assembly can be removed from a vehicle brake via the removed section without having to remove the wheel hub from an axle assembly.

In one example, the hub flange includes a plurality of apertures that are to receive wheel studs such that the wheel hub can be attached to another wheel component. The insert includes at least one aperture that is to receive one of these wheel studs. In this example, the apertures each have a center that is positioned at a common radial distance from the axis. The aperture in the insert also has a center that is positioned at this common radial distance from the axis.

In one example, the insert comprises a plate that is attached to the hub flange with a plurality of fasteners.

In one example, the insert is associated with a brake drum that is attached to the wheel hub.

To remove the camshaft assembly from the vehicle brake, the insert is detached from the hub flange to provide the removed section. The camshaft assembly is then disassembled from the vehicle brake by being slid along a linear path through the removed section. To re-assemble the vehicle brake, the camshaft assembly is slid back through the removed section. The insert is then re-attached to the hub flange.

These and other features of the present invention can be best understood from the following specification and drawings, the following of which is a brief description.

BRIEF DESCRIPTION OF THE DRAWINGS

FIG. 1 is a perspective view of a cam brake assembly.

FIG. 2 is a highly schematic end view of a cam brake assembly with a brake drum.

FIG. 3 is a schematic cross-sectional view of an example of an attachment interface between a brake drum, wheel hub, and wheel rim.

FIG. 7 is a highly schematic representation of an insert formed as part of a brake drum.

FIG. 8 is a highly schematic representation of an insert that is attached to a brake drum.

DETAILED DESCRIPTION OF THE PREFERRED EMBODIMENT

Figure 4:
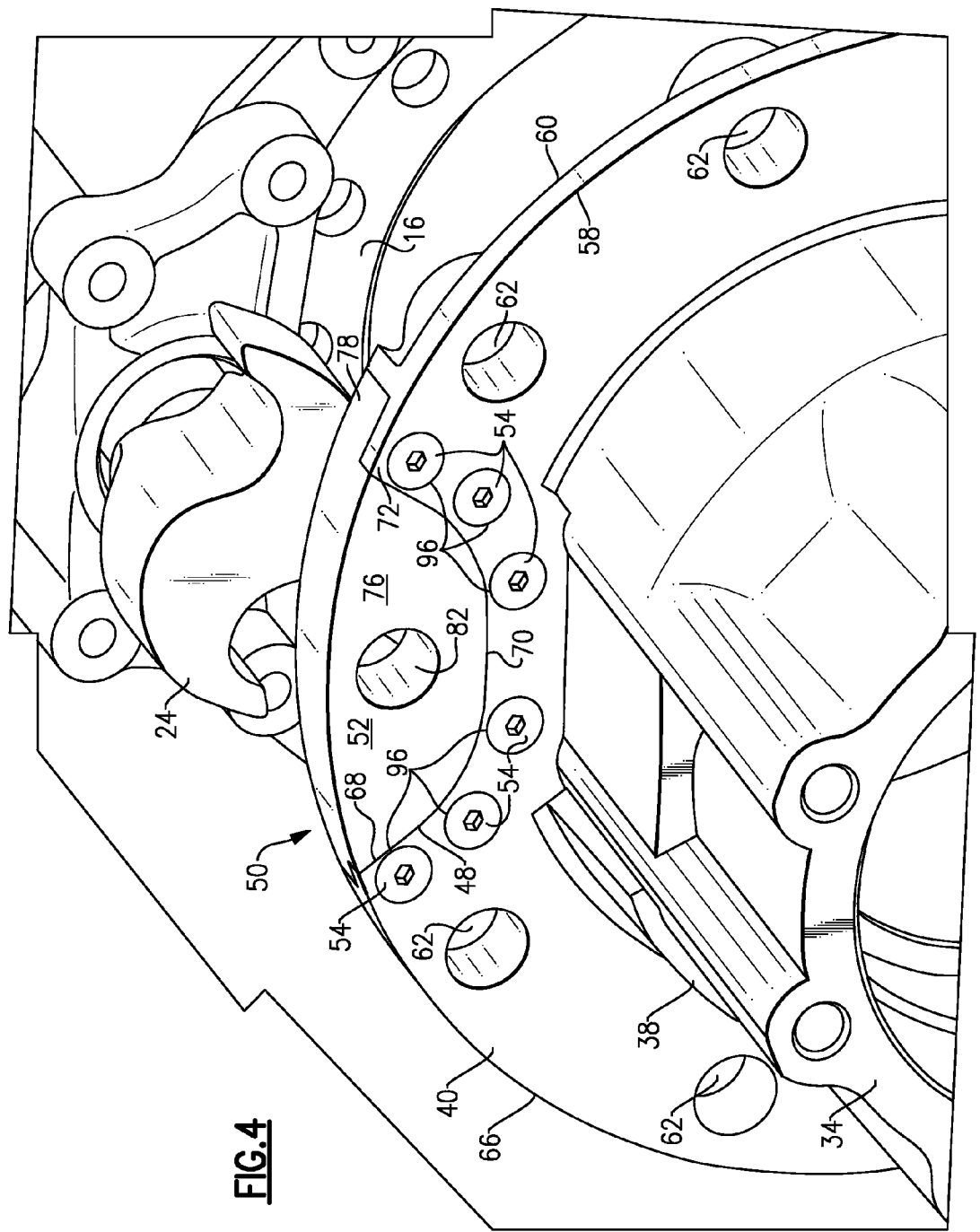
FIG. 4 is a perspective view of a removed section and insert from one side of the wheel hub.

A brake assembly 10 is shown in FIGS. 1 and 2. The brake assembly 10 includes a pair of brake shoes 12 that include a brake lining 14. The brake shoes 12 are supported on a brake spider 16 that is attached to a non-rotating axle component (not shown) of an axle assembly. A camshaft assembly 18 is used to move the brake shoes 12 into engagement with a brake drum 20. The camshaft assembly 18 includes a shaft 22 that has an S-shaped cam 24 at one shaft end. A bracket assembly 26 supports the shaft 22. The cam 24 pivots against brake shoe rollers 28 to move the brake shoes 12 into engagement with an inner surface of the brake drum 20.

The brake shoes 12 are coupled together with a retaining spring 30 at one end, and a shoe return spring 32 is used to move the brake shoes 12 away from the brake drum 20 after a braking operation.

The brake drum 20 is mounted to a wheel hub 34 as shown in FIG. 3. The wheel hub 34 and brake drum 20 are mounted to the axle assembly and rotate together about an axis A. Also attached to the wheel hub 34 are wheel discs 36 each having a rim that supports a tire (not shown). The wheel hub 34 includes a hub body 38 with a hub flange 40 extending outwardly from the hub body 38 to surround the axis A. FIG. 3 only shows a lower portion of the wheel hub 34, brake drum 20, and wheel discs 36, but it should be understood that these elements surround the axis A as known.

In the example shown, the wheel discs 36 and brake drum 20 are mounted on a common side of the hub flange 40 with a common set of fasteners 42 (only one is shown). The brake drum 20 and wheel discs 36 could also be mounted on opposing sides of the hub flange 40 from each other.

Figure 5:
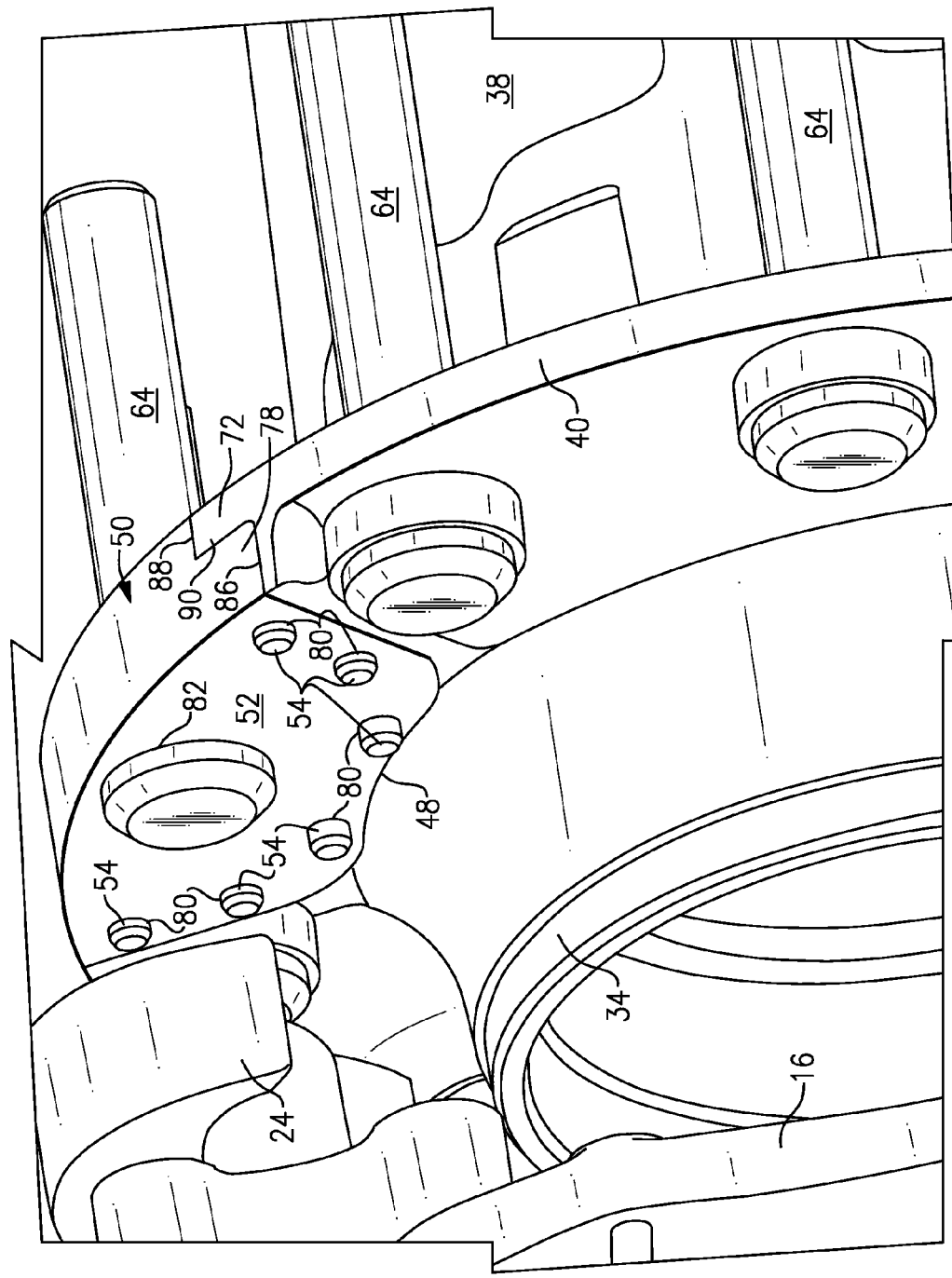
FIG. 5 is a perspective view of the removed section and insert from an opposite side of the wheel hub.
Figure 6:
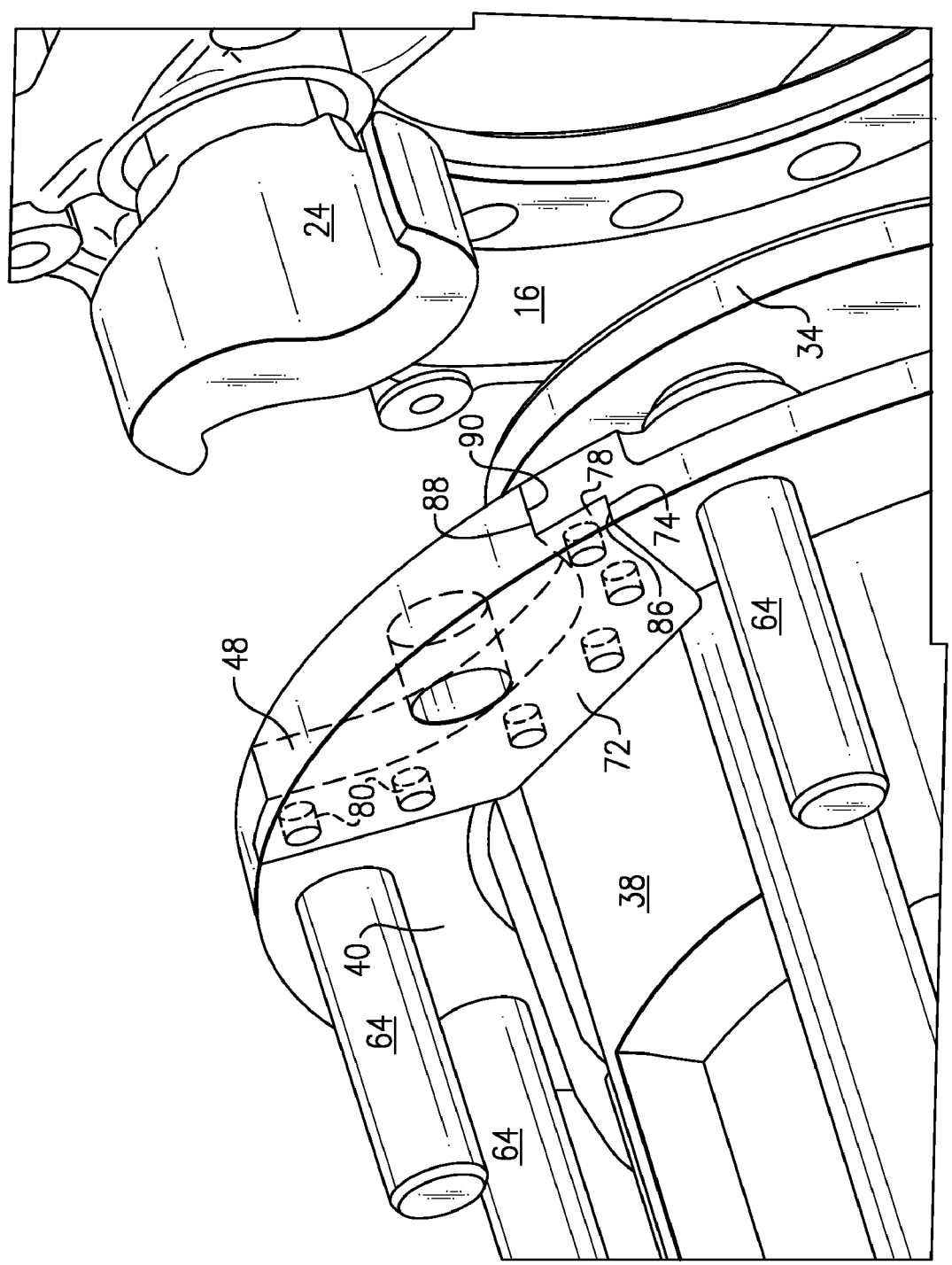
FIG. 6 is a perspective view of the wheel hub and insert with the removed section identified with a hidden view perspective.

The wheel hub 34 is shown in greater detail in FIGS. 4-6. The hub flange 40 includes a removed section 48 that is aligned with the cam 24 of the camshaft assembly 18. An insert 50 comprises a separate piece that is used to fill the removed section 48. The insert 50 is selectively removable from the wheel hub 34 to provide the removed section 48. When the insert 50 is removed, the camshaft assembly 18 can be removed from brake assembly 10 via the removed section 48 without having to detach the wheel hub 34 from the axle assembly. This is advantageous from a maintenance cost and labor perspective.

Thus, the camshaft assembly 18 can be removed for service operations as needed without requiring removal of the wheel hub 34, i.e., the wheel hub 34 can remain mounted to the axle assembly. Once service has been completed, the camshaft assembly 18 can be re-installed by sliding the camshaft assembly 18 through the removed section 48, and then the insert 50 can then be re-inserted into the removed section 48 and re-attached to the hub flange 40. Thus, the insert 50 strengthens the wheel hub 34 by filling in the removed section 48 during normal vehicle operations. The insert 50 has a thickness that is optimized to provide a desired level of stiffness to provide a satisfactory system life. This will be discussed in greater detail below.

In the example shown in FIGS. 4-6, the insert 50 comprises a plate 52 that is inserted into the removed section 48 and which is secured to the hub flange 40 with a plurality of fasteners 54. When the fasteners 54 are removed, the plate 52 can be detached from the hub flange 40 to provide the removed section 48.

The hub flange 40 includes a first side 58 and a second side 60 facing opposite of the first side 58. A plurality of apertures 62 are formed within the hub flange 40 and extend through the hub flange 40 from to the first side 58 to the second side 60. The apertures 62 receive fasteners 64, such as wheel studs, that secure the wheel hub 34 to other wheel components such as the brake drum 20 and/or the wheel disc 36.

The hub flange 40 extends outwardly from the hub body 38 to define an outermost peripheral edge 66. The removed section 48 provides a recess in the hub flange 40 that extends from the first side 58 to the second side 60 and is open to the outermost peripheral edge 66. In the example shown, the removed section 48 is formed as a wedge shaped section that is wider at an outermost peripheral edge portion 68 than at a base portion 70; however, other section shapes could also be used.

The hub flange 40 includes a mounting lip 72 that is formed about a periphery of the removed section 48. A wall 74 (FIG. 6) is formed along the mounting lip 72 to locate the insert 50. The mounting lip 72 includes a plurality of apertures 96 that receive the fasteners 54.

As discussed above, the insert 50 comprises a plate 52 and has a main portion 76 and a mounting flange portion 78 that extends about a portion of the periphery of the main portion. The mounting flange portion 78 overlaps the mounting lip 72 such that there is abutting contact between the mounting flange portion 78 and the mounting lip 72. The mounting flange portion 78 includes a plurality of apertures 80 that are aligned with the apertures 96 such that the fasteners 54 can be used to secure the plate 52 to the hub flange 40.

The plate 52 also includes at least one aperture 82 that receives one of the fasteners 64 that is used to secure the wheel hub 34 to the brake drum 20 and/or wheel disc 36. The apertures 62 formed within the hub flange 40 each have a center that is located at a common radial distance R1 (FIG. 3) from the axis A. The aperture 82 also has a center that is located at this radial distance R1 from the axis A. Thus, the aperture 82 and the apertures 62 cooperate to form a bolt circle for mounting the wheel hub 34 to the brake drum 20 and/or brake disc 36.

An outer peripheral edge 86 of the mounting flange portion 78 abuts against the wall 74 of the removed section 48. An outer peripheral edge 88 of the main portion 76 abuts against another wall 90 that defines the removed section 48. Thus, the insert 50 is easily located and held in place within the removed section 48 such that the fasteners 54 can be installed.

In the example shown, the mounting flange portion 78 of the insert 50 has a first thickness, and the main portion 76 has a second thickness that is different than the first thickness. The aperture 82 is formed within the main portion 76. The thicknesses of the main portion 76 and mounting flange portion 78 are optimized to fill in the removed section 48 such that the wheel hub 34 has sufficient strength and stiffness to provide a desired system life level.

In the example shown in FIG. 7, the removed section 48 is filled in by an insert 100 that is formed as part of a brake drum 102. The insert 100 can be formed with the brake drum 102 as a single piece component, or the insert 100 can be separately attached to the brake drum 102 with at least one fastener 200 as shown in FIG. 8. Optionally, a brake drum can be modified to have a thicker flange to provide increased stiffness.

The inserts 50, 100 are selectively removable from the hub flange 40 such that the camshaft assembly 18 can be removed and serviced without requiring removal of the wheel hub 34. The inserts 50, 100 are removable along a radial and/or a linear path that extends through the removed section 48. The linear path is generally parallel to the axis A. The inserts 50, 100 are then re-attached after servicing to provide the wheel hub 34 with sufficient strength and stiffness during vehicle operation.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A wheel hub comprising:
   a hub body rotatable about an axis;
   a hub flange extending about said hub body, said hub flange including a plurality of apertures to receive wheel fasteners, and said hub flange including a removed section to be aligned with a camshaft assembly, and wherein said hub flange comprises a single flange member that is to be positioned on only one side of a wheel component to be attached to said hub flange, and wherein said removed section is open to an outer peripheral edge of said single flange member; and
   an insert that at least partially fills said removed section, said insert being selectively removable from said hub flange such that the camshaft assembly is removable from a brake assembly via said removed section without requiring the wheel hub to be removed from an axle assembly.

2. The wheel hub according to claim 1 wherein said insert includes at least one aperture to receive one of the wheel fasteners.

3. The wheel hub according to claim 1 wherein said insert is fastened to said hub flange with at least one insert fastener.

4. The wheel hub according to claim 1 wherein said insert is defined by a maximum thickness that is substantially as thick as a maximum thickness of said hub flange.

5. The wheel hub according to claim 1 wherein said insert is formed as part of a brake drum.

6. The wheel hub according to claim 1 wherein said insert is attached to a brake drum with at least one fastener.

7. The wheel hub according to claim 1 wherein said hub body and said hub flange are integrally formed together as a single piece component.

8. A wheel hub comprising:
   a hub body rotatable about an axis;
   a hub flange extending about said hub body, said hub flange including a plurality of apertures to receive wheel fasteners, and said hub flange including a removed section to be aligned with a camshaft assembly, and wherein said hub flange includes a first side and a second side facing opposite from said first side, and wherein said hub flange extends outwardly from said hub body to an outermost peripheral surface, said removed section defining an area that is open to said outermost peripheral surface and to said first and said second sides; and
   an insert that at least partially fills said removed section, said insert being selectively removable from said hub flange such that the camshaft assembly is removable from a brake assembly via said removed section without requiring the wheel hub to be removed from an axle assembly.

9. The wheel hub according to claim 8 wherein said hub flange includes a mounting lip formed about a perimeter of said removed section.

10. The wheel hub according to claim 9 wherein said insert comprises a plate having a main portion that fills said removed section and a mounting flange portion extending about a portion of a perimeter of said main portion, said mounting flange portion overlapping said mounting lip of said hub flange.

11. The wheel hub according to claim 10 wherein said mounting lip includes a first plurality of apertures that are aligned with a second plurality of apertures in said mounting flange portion, said first and said second plurality of apertures receiving a plurality of insert fasteners to secure said insert to said hub flange.

12. The wheel hub according to claim 10 wherein said main portion is defined by a first thickness and said mounting flange portion is defined by a second thickness that different than said first thickness.

13. A vehicle wheel assembly comprising:
    a drum brake assembly having a pair of brake shoes that are movable into engagement with a brake drum by a camshaft assembly;
    a wheel hub mounted for rotation with said brake drum about an axis, said wheel hub having a hub flange extending about said wheel hub and including a plurality of wheel mounting apertures that each have centers that are located at a common radial distance from said axis, and wherein said hub flange includes a removed section to be aligned with said camshaft assembly; and
    an insert that at least partially fills said removed section, said insert including a least one aperture that has a center that is located at said common radial distance from said axis, and said insert being selectively removable from said hub flange such that said camshaft assembly is removable from said drum brake assembly via said removed section without requiring said wheel hub to be removed from an axle assembly.

14. The vehicle wheel assembly according to claim 13 wherein said camshaft assembly includes a cam mounted on a shaft, said cam being pivoted by said shaft to move said pair of brake shoes into engagement with said brake drum, and wherein said cam and said shaft are movable as unit along a linear path through said removed section, said linear path being generally parallel to said axis.

15. The vehicle wheel assembly according to claim 13 wherein said insert comprises a plate that is secured to said hub flange with a plurality of insert fasteners, said plate being detached from said hub flange to allow said camshaft assembly to be removed from said drum brake assembly.

16. A method for removing a camshaft assembly from a brake assembly comprising the steps of:
    (a) removing an insert from a wheel hub flange to provide a removed section within the wheel hub flange; and
    (b) sliding a camshaft assembly through the removed section to remove the camshaft assembly from a brake assembly without requiring a wheel hub to be removed from an axle assembly.

17. The method according to claim 16 including the steps of re-installing the camshaft assembly by sliding the camshaft assembly through the removed section and subsequently reattaching the insert to the wheel hub flange.

18. The method according to claim 16 wherein said step (a) includes removing a plurality of insert fasteners to detach the insert from the wheel hub flange.

19. The method according to claim 16 wherein the wheel hub flange includes a plurality of apertures to receive wheel fasteners to secure the wheel hub flange to another wheel component, and wherein the insert includes at least one aperture to receive one of the wheel fasteners for securement to the other wheel component.

* * * * *